(12) United States Patent
Lennartson et al.

(10) Patent No.: US 9,112,598 B2
(45) Date of Patent: Aug. 18, 2015

(54) REPORT MECHANISM IN A RADIO SYSTEM REUSING ONE TIME-SLOT

(75) Inventors: Benny Lennartson, Hägersten (SE); Tomas Andersson, Västerås (SE); Miguel Lopez, Solna (SE)

(73) Assignee: Telefonaktiebolaget L M Ericsson (publ), Stockholm (CH)

( * ) Notice: Subject to any disclaimer, the term of this patent is extended or adjusted under 35 U.S.C. 154(b) by 969 days.

(21) Appl. No.: 12/864,797

(22) PCT Filed: Nov. 12, 2008

(86) PCT No.: PCT/SE2008/051296
§ 371 (c)(1),
(2), (4) Date: Jul. 27, 2010

(87) PCT Pub. No.: WO2009/096843
PCT Pub. Date: Aug. 6, 2009

(65) Prior Publication Data
US 2010/0311410 A1    Dec. 9, 2010

Related U.S. Application Data

(60) Provisional application No. 61/027,943, filed on Feb. 12, 2008.

(30) Foreign Application Priority Data

Jan. 30, 2008    (WO) ................. PCT/SE2008/050116

(51) Int. Cl.
*H04B 10/293*    (2013.01)
*H04B 17/00*    (2015.01)

(52) U.S. Cl.
CPC ................................. *H04B 17/0057* (2013.01)

(58) Field of Classification Search
USPC ............ 455/522, 67.11, 68–70, 127.1, 127.5, 455/574, 343.5, 450, 451, 452.1, 464, 509, 455/516, 517; 370/318, 236.1, 395.41, 332
See application file for complete search history.

(56) References Cited

U.S. PATENT DOCUMENTS 4,736,170 A    4/1988    Wu et al.
5,469,112 A    11/1995    Lee
(Continued)

FOREIGN PATENT DOCUMENTS

CN    1473402 A    2/2004
CN    1533071 A    9/2004
(Continued)

OTHER PUBLICATIONS

3rd Generation Partnership Project. "Voice Capacity Evolution with Orthogonal Sub Channels." 3GPP TSG G ERAN #33, Tdoc GP-070214, Seoul , South Korea, Agenda Item 6.1, 7.1.5.6, Feb. 12-16, 2007.*

(Continued)

*Primary Examiner* — Kibrom T Hailu
*Assistant Examiner* — Zewdu A Beyen
(74) *Attorney, Agent, or Firm* — Coats & Bennett, PLLC

(57) ABSTRACT

In a radio system node, such as a Base Transceiver Station (BTS), a compensation unit is provided to convert information about downlink signal strength in a measurement report received from a mobile station when the signal to the mobile station is transmitted using several co-channel signals transmitted simultaneously in the same time slot and at the same frequency.

6 Claims, 3 Drawing Sheets

(56) References Cited

U.S. PATENT DOCUMENTS

| | | |
|---|---|---|
| 6,185,259 B1 | 2/2001 | Dent |
| 6,243,413 B1 | 6/2001 | Beukema |
| 6,385,233 B1 | 5/2002 | Berger |
| 6,421,398 B1 | 7/2002 | McVey |
| 6,654,405 B1 | 11/2003 | McDonough |
| 6,728,228 B1 * | 4/2004 | Ostman et al. ............... 370/332 |
| 6,865,235 B2 | 3/2005 | Khoini-Poorfard |
| 7,944,884 B2 | 5/2011 | Chitrapu et al. |
| 8,149,727 B2 | 4/2012 | Futagi et al. |
| 2002/0037059 A1 | 3/2002 | Heegard et al. |
| 2002/0110154 A1 | 8/2002 | Odenwalder |
| 2002/0131478 A1 | 9/2002 | Somayazulu et al. |
| 2002/0168026 A1 | 11/2002 | Khoini-Poorfard |
| 2003/0099306 A1 | 5/2003 | Nilsson et al. |
| 2004/0013172 A1 | 1/2004 | Hashiguchi et al. |
| 2004/0114551 A1 | 6/2004 | Gavillero Martin et al. |
| 2004/0184560 A1 | 9/2004 | Shen et al. |
| 2005/0002471 A1 | 1/2005 | Tramm et al. |
| 2005/0084044 A1 | 4/2005 | Kokkonen |
| 2005/0152473 A1 | 7/2005 | Maltsev et al. |
| 2005/0254600 A1 | 11/2005 | Chen et al. |
| 2007/0070968 A1 | 3/2007 | Kawasaki |
| 2007/0195907 A1 | 8/2007 | Wang et al. |
| 2007/0268977 A1 | 11/2007 | Wang et al. |
| 2008/0159246 A1 | 7/2008 | Niemela |
| 2008/0240151 A1 | 10/2008 | Chitrapu et al. |
| 2009/0135957 A1 | 5/2009 | Norris et al. |
| 2010/0157833 A1 | 6/2010 | Vrcelj et al. |
| 2010/0208716 A1 | 8/2010 | Mujtaba et al. |
| 2011/0007624 A1 | 1/2011 | Lopez |

FOREIGN PATENT DOCUMENTS

| | | |
|---|---|---|
| CN | 101005303 A | 7/2007 |
| EP | 1037437 A2 * | 9/2000 |
| JP | H11122312 A | 4/1999 |
| JP | 2007096740 A | 4/2007 |
| WO | 2007037412 A1 | 4/2007 |
| WO | 2009096832 A1 | 8/2009 |

OTHER PUBLICATIONS

3rd Generation Partnership Project. "Voice Capacity Evolution with Orthogonal Sub Channels." 3GPP TSG GERAN #36, Tdoc GP-071792, Vancouver, Canada, Agenda Item 6.1, 7.1.5.18, Nov. 12-16, 2007.

3rd Generation Partnership Project. "Multi-User Reusing-One-Slot (MUROS)." 3GPP TSG GERAN #36, GP-072027, Vancouver, Canada, Agenda Item 6.1,7.1.5.18m Nov. 12-16, 2007.

Hill, D. et al, "Carrier Detection of Unbalanced QPSK Direct Sequence Signals", Military Communications Conference Proceedings, 1999, pp. 437-441, IEEE, vol. 1.

Khairy, M., "Asymmetric Modulation and Multistage Coding for Multicasting with Multi-Level Reception over Fading Channels", Military Communications Conference Proceedings, Oct. 31, 1999, pp. 92-96, Atlantic City, NJ, IEEE.

3rd Generation Partnership Project. "Voice Capacity Evolution with Orthogonal Sub Channel." 3GPP TSG GERAN #33, Tdoc GP-070214, Seoul, South Korea, Agenda Itel 6.1, 7.1.5.6, Feb. 12-16, 2007.

* cited by examiner

REPORT MECHANISM IN A RADIO SYSTEM REUSING ONE TIME-SLOT

TECHNICAL FIELD

The present invention relates to a method and a device for processing signals transmitted in a cellular radio system.

BACKGROUND

The Global System for Mobile communication (GSM) is a single carrier system in which a speech user is assigned to one timeslot. The information bits on this timeslot contain information intended only to this user. If half-rate is used, then every second burst is used by one user and every other burst is used by another user. Moreover, in the half-rate channel the information bits on one burst are connected to only one user.

In order to alleviate the pressure for GSM network expansion, a new study item dubbed MUROS (Multi-User Reusing One Slot) has been proposed in GERAN (the 3GPP standardization of GSM) 3GPP TSG GERAN Meeting #36, GP072027. The goal is to multiplex two speech users in the same time slot and in the same frequency.

There are several possible technical realizations of MUROS. Regardless of the implementation used the system will benefit from always having accurate knowledge of the signal strength at each User equipment.

Hence there exists a need for a method and a system providing for an accurate report relating to current signal strengths.

SUMMARY

It is an object of the present invention to overcome or at least reduce some of the problems associated with mechanisms for reporting signal strength.

It is another object of the present invention to overcome or at least reduce some of the problems associated with mechanisms for reporting signal strength when a signal is transmitted using $\alpha$-QPSK modulation or adaptive $\alpha$-QPSK modulation.

At least one of the above objects is obtained by a method and a radio system node as set out in the appended claims. Hence in a radio system node, such as a Base Transceiver Station (BTS), a compensation unit is provided to convert information about downlink signal strength in a measurement report received from a mobile station when the signal to the mobile station is transmitted using several co-channel signals transmitted simultaneously in the same time slot and at the same frequency.

In accordance with one embodiment the transmitter is adapted to feed the compensation unit with the relative powers of the co-channels.

In accordance with one embodiment the signal is transmitted as an $\alpha$-QPSK modulated signal and in particular as an adaptive $\alpha$-QPSK modulation signal.

In accordance with one embodiment a converted report is sent from a BTS to the Base Station Controller (BSC).

In accordance with one embodiment a report is converted based on the $\alpha$ used in the corresponding downlink transmission.

In PCT/SE2008/050116 incorporated herein by reference it is proposed to use a hybrid quaternary modulation in the DL (Downlink). The signal constellation is parameterized by a real valued parameter called $\alpha$. Accordingly, the multiplexing and modulation scheme is called $\alpha$-QPSK. The two user signals are mapped to the real and imaginary parts of the baseband signal. These are called the I and Q sub-channels, and under some conditions they are orthogonal. The proposal PCT/SE2008/050116 allows compatibility between MUROS capable networks and legacy Mobile stations (MS).

In U.S. 61/024,685 incorporated herein by reference an enhanced power control algorithm is suggested. This algorithm will optimize the setting of the parameter $\alpha$ so that the shape of the signal constellation described in PCT/SE2008/050116 can be adjusted according to the power required by each user.

For a legacy mobile using received signals on the downlink where the signal is transmitted using an adaptive $\alpha$-QPSK modulation, the measured signal strength on the downlink will as is realized by the inventor be the sum of the signal power received on both sub channels. This is due to the fact that a legacy mobile is not aware of the existence of two sub-channels. This means that the signal strength reported to the Base Station Controller (BSC), in a layer 3 (L3) message MEASUREMENT REPORT, will not be correct. Even Single Antenna Interference Cancellation (SAIC)-type of mobile stations designed specifically to decode one orthogonal sub-channel may be able to report only the total signal strength.

As a result all functionality in the BSC that uses the signal strength as input will be producing misleading output if the total receiver power is used.

To exemplify, based on this signal strength measure decisions are taken in the BSC to do inter-cell handovers; intra-cell handovers; change of power control. In the worst case, this could lead to a dropped call.

Using the radio system node and method in accordance with the invention will enable reuse of existing BSC functionality, such as Power Control, Locating functionality controlling things such as inter- and intra-cell handovers, without modification even when two users are multiplexed in the downlink using adaptive $\alpha$-QPSK-modulation or a similar modulation with two or more co-channels being transmitted in the same timeslot at the same frequency.

BRIEF DESCRIPTION OF THE DRAWINGS

The present invention will now be described in more detail by way of non-limiting examples and with reference to the accompanying drawings, in which.

DETAILED DESCRIPTION

Figure 1:
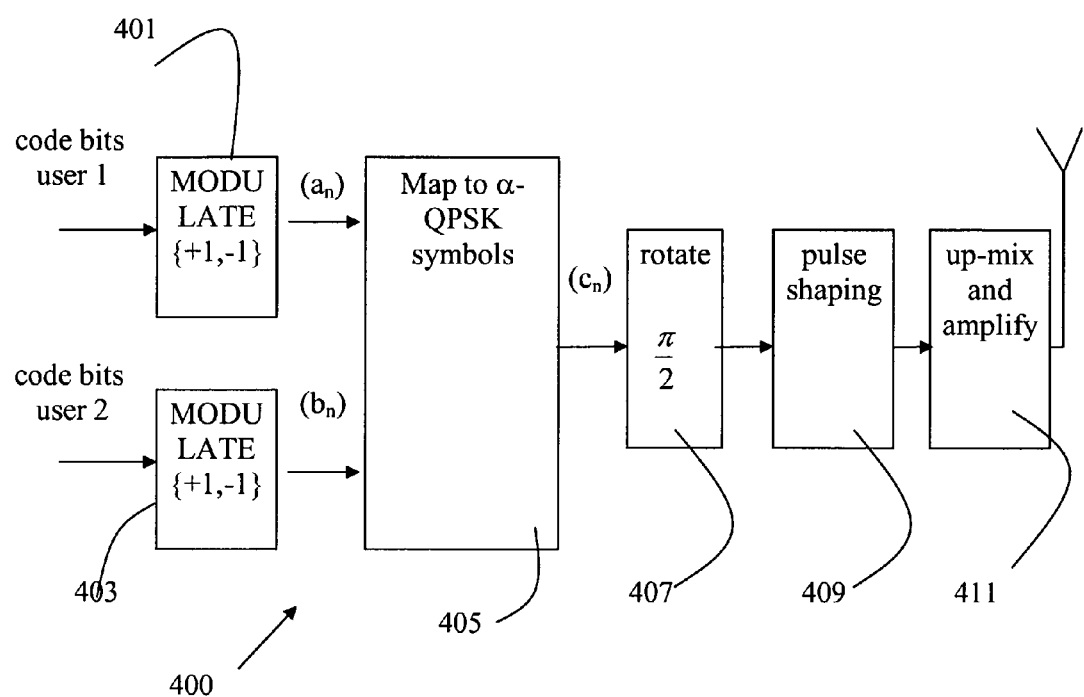
FIG. 1 is a view of an adapted $\alpha$-QPSK modulator.

In the examples below the modulation used is $\alpha$-QPSK. However the invention can also be applied to other modulation techniques transmitting several co-channels in the same time slot at the same frequency. In FIG. 1, a modulator 400 configured to divide the total energy of a QPSK modulated signal unequally between the two branches of the modulated signal is depicted. The exemplary modulator 400 can be used in transmission of data using an adaptive $\alpha$-QPSK modulation. The modulator 400 comprises initial modulators 401 and 403 for receiving and modulating to binary symbols the data sequences to be transmitted to two different mobile stations. The modulators 401 and 403 are coupled to a mapping unit 405 adapted to map the signals from the modulators 401 and 403 in accordance with an adaptive $\alpha$-QPSK constellation. The adaptive $\alpha$-QPSK constellation sequence formed in the unit 405 is forwarded to a rotation block 407 connected to a pulse shaping filter 409 which in turn is connected to a unit 411 adapted to mix-up and amplify the multiplexed data sequence to be transmitted to the intended receivers to the carrier frequency.

The modulator 400 may receive feedback from one or both mobile stations to which data is transmitted. In response to received feedback the modulator can be adapted to adjust α accordingly. For example α may be set to depend upon the distances from the two mobile stations to the Base Transceiver Station (BTS), the reported received signal quality (RXQUAL), or upon the capabilities of the mobile stations, e.g. legacy/aware of the existence of the co-existing channels.

As mentioned above, a mobile station, either legacy or possibly aware of the sub-channel structure, using one of the sub-channels in an α-QPSK modulated signal, as described in PCT/SE2008/050116 will report a signal strength in a measurement report that contains an estimate of the total power in both sub-channels sharing the same timeslot. To overcome the problems related to such a mechanism the measurement report is modified in a node of radio system before being forwarded in the system.

Figure 2:
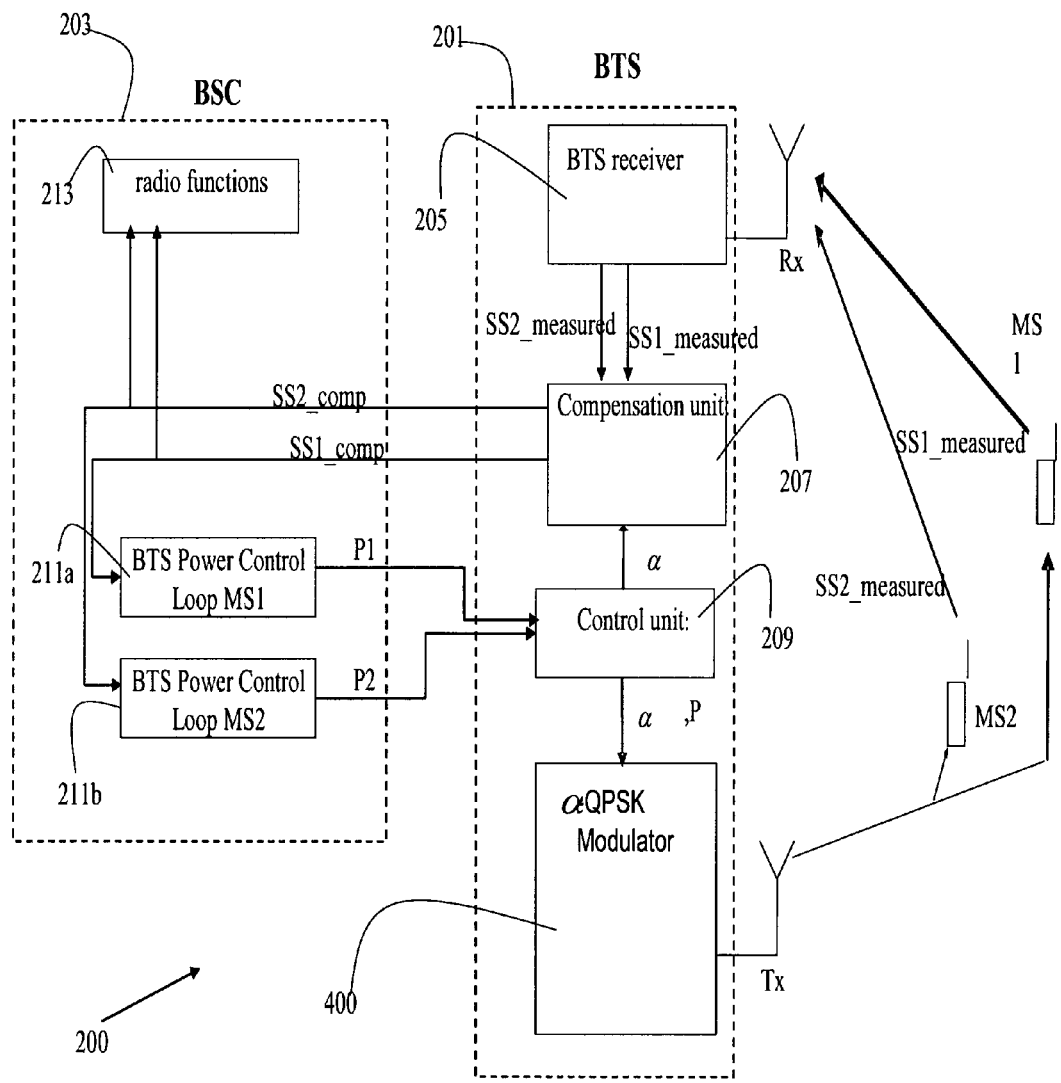
FIG. 2 is a view of a radio system.

In FIG. 2, an exemplary radio system 200, such as a GSM system, transmitting a signal on sub-channels, such as an α-QPSK modulated signal, is depicted. The system described below is a GSM system but the invention is not limited to a GSM system and can be applied to other types of multiplexing and modulation schemes, where several co-channel signal are transmitted simultaneously but the receivers can only estimate the total receiver power. In the exemplary embodiment described in conjunction with FIG. 2 the transmission is performed using an α-QPSK modulated signal.

In FIG. 2, two mobiles stations, labeled MS1 and MS2, are receiving α-QPSK-modulated signals on two sub-channels transmitted by a Base Transceiver Station (BTS) 201. The system 200 further comprises a Base Station Controller (BSC) 203. The BTS 201 comprises a BTS receiver for receiving radio signals from mobile stations MS1 and MS2. The BTS 201 further comprises a compensation unit 207 for compensating reported received signals strengths from mobile stations MS1 and MS2. The BTS 201 further comprises a Control unit 209 adapted to select a value for α to be used for transmitting an α-QPSK modulated signal. The value selected by the Control Unit 209 is fed to the compensation unit 207 and to a modulator 400 adapted to modulate signals to be transmitted to the mobile stations MS1 and MS2.

The BSC 203 comprises control loops 211a and 211b for controlling transmit power to the respective Mobile stations MS1 and MS2.

In use, the power control loops 211a and 211b in the BSC 203 will calculate two separate power levels for each sub channel used for transmitting signals to the mobile stations MS1 and MS2. This power level can be calculated using a conventional power control loop. As a result the power control loops 211a and 211b assume that the power is the power that will be used on the downlink from the BTS 201. The two power levels determined by the loops 211a and 211b, denoted P1 and P2 in FIG. 2, can be sent over the Abis interface to the BTS 201. In the BTS 201 the control unit 209 can be adapted to decide what α to use on the α-QPSK modulated signal so that the power for the transmitted data is set in response to the relative gain of the two branches. In particular α is set such that the power experienced by each of the mobile stations is equal to what they would require if they were alone on the timeslot.

However, since a legacy mobile will measure the signal strength as described in 3GPP 45.008 specification, it follows that it will measure the total power used for both sub channels. Even a mobile aware of the sub-channels may report the signal strength in the same way. The mobiles will report the signals strengths, SS1_measured and SS2_measured, in a measurement report to the BTS 201.

In the Compensation Unit 207 in the BTS 201, the reported signal strengths are compensated depending on the α used in the previous transmission period. The compensated signal strengths, called SS1_comp and SS2_comp in FIG. 2, are then transmitted in the measurement result to the BSC 203 where it is fed into the power control loop.

In accordance with one embodiment all BSC functionality using the downlink signal strength as input, generally referred to as radio functions 213 in FIG. 2, as input can be set to use the compensated reported signal strength as input signal.

In accordance with one embodiment the unit 207 can be placed in the BSC node 203. However, in case the compensation is performed in the BSC node 203 or any other node where the unit deciding the α to be used is not located the value of the α used must be forwarded from the BTS 201 to the BSC 203 or from the node where the α is determined to the node where the compensated signal strength report is generated.

In case the unit 207 is located in the BSC 203, the α value used during different transmission periods also needs to be sent over Abis to the BSC.

Figure 3:
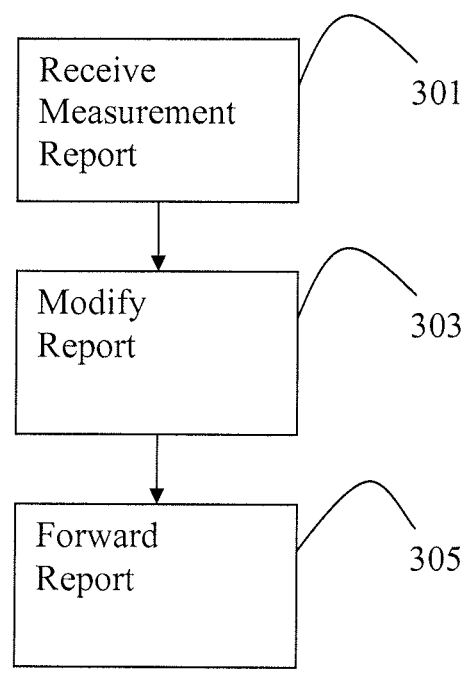
FIG. 3 is a flowchart illustrating steps when generating a measurement report in a node of a radio system.

In FIG. 3, a flow chart illustrating procedural steps when generating a measurement report is depicted. The procedure in FIG. 3 can for example be performed in the Unit 207 of FIG. 2. First in a step 301 a measurement report is received from a mobile station. Next, in a step 303 the measurement report is modified based on the individual signal strength of the sub-channel used in the transmission for the mobile station when several co-channel signals are transmitted simultaneously. Thus, because the individual mobile station measures the total signal strength and all power is not used for the sub-channel of the mobile station the report, if not modified can be misleading. This modification will typically only change the value in the measurement result by a few dB. If the report is modified in the BTS, no additional changes are needed in the BSC node. Thereupon the modified report is forwarded to an intended receiver in a step 305. For example, when the report is generated in a BTS, the BTS can forward the modified report to an associated BSC and the BSC can use the modified report in its power control.

For example, suppose that the legacy mobile measures the signal strength on the downlink to −65 dBm. Assume further that sub-channels are provided by the use of adaptive α QPSK modulation. Assume also that the α compensation for this specific sub channel was −2 dB, i.e. the signal on this sub channel was 2 dB weaker than the total signal power), compared to the total transmitted power for both channels. Then in step 303 the BTS will compensate this measurement with −2 dB from −65 dBm to −67 dBm, for this sub channel. This means that the signal strength reported to the BSC 203, in the measurement result, will be −67 dBm.

The invention is as set out above applicable to all types of multiplexing and modulation schemes where several co-channel signal are transmitted simultaneously but the receivers do not or cannot estimate the signal strength of their own sub-channel, but can only estimate the total receiver power. An important field of application is when transmission is based on the use of adaptive α QPSK modulation. The transmitter is adapted to feed the compensation unit with the relative powers of the sub-channels.

With this invention it is possible to reuse today's BSC functionality such as for example Power Control, Locating functionality controlling things such as inter- and intra-cell handovers, without any modification even when two users are multiplexed in the downlink using for example α-QPSK-modulation.

The invention claimed is:

1. A method, performed in a node of a wireless communication network, said method comprising:
   transmitting several co-channel signals simultaneously in the same time slot on the same frequency using an α-OPSK modulation;
   receiving a measurement report from a mobile station indicating a total signal strength of the co-channel signals; and
   modifying the measurement report based on an individual power set for one of the co-channel signals intended for the mobile station and the value of α used in the transmission.

2. The method of claim 1 wherein the individual power is provided from a transmitter of the wireless communication network node.

3. The method of claim 1 wherein the report is modified in a Base Transceiver Station and reported to a Base Station Controller.

4. A node of a wireless communication network, comprising:
   a transmitter configured to transmit several co-channel signals simultaneously in the same time slot on the same frequency using an α-QPSK modulation;
   a receiver configured to receive a measurement report from a mobile station indicating a total signal strength of the co-channel signals; and
   a compensation unit configured to modify the measurement report based on an individual power set for one of the co-channel signals intended for the mobile station and the value of α used in the transmission.

5. The node of claim 4, wherein the transmitter is operative to provide individual powers of the co-channels to the compensation unit.

6. The node of claim 4 wherein the node is a Base Transceiver Station.

* * * * *

UNITED STATES PATENT AND TRADEMARK OFFICE
CERTIFICATE OF CORRECTION

PATENT NO. : 9,112,598 B2
APPLICATION NO. : 12/864797
DATED : August 18, 2015
INVENTOR(S) : Lennartson et al.

It is certified that error appears in the above-identified patent and that said Letters Patent is hereby corrected as shown below:

On the Title Page, in Item (73), under "Assignee", in Column 1, Line 2, delete "(CH)" and insert -- (SE) --, therefor.

In Column 3, Line 7, delete "adjust a" and insert -- adjust $\alpha$ --, therefor.

In Column 5, Line 10, in Claim 1, delete "$\alpha$-OPSK" and insert -- $\alpha$-QPSK --, therefor.

Signed and Sealed this
Twenty-third Day of August, 2016

Michelle K. Lee
*Director of the United States Patent and Trademark Office*